United States Patent [19]
Brekau et al.

[11] Patent Number: 5,885,485
[45] Date of Patent: Mar. 23, 1999

[54] PROCESS FOR PRODUCING LOW-SALT SILICA SOL DISPERSIONS IN LOW-BOILING ALCOHOLS

[75] Inventors: Uwe Brekau, Köln; Bernd Rosenow; Hans-Dieter Block, both of Leverkusen, all of Germany

[73] Assignee: Bayer Aktiengesellschaft, Germany

[21] Appl. No.: 871,054

[22] Filed: Jun. 9, 1997

[30] Foreign Application Priority Data

Jun. 10, 1996 [DE] Germany .......... 196 23 062.4

[51] Int. Cl.⁶ .......... B01J 13/00; C01B 33/145
[52] U.S. Cl. .......... 252/309; 106/287.34
[58] Field of Search .......... 252/309; 106/287.34

[56] References Cited

U.S. PATENT DOCUMENTS

| | | | |
|---|---|---|---|
| 300,492 | 6/1884 | McGovern | 104/233 |
| 2,244,325 | 6/1941 | Bird | 252/313.2 |
| 2,801,185 | 7/1957 | Iler | 252/309 |
| 2,974,103 | 3/1961 | Goff | 508/319 |
| 3,051,657 | 8/1962 | Power et al. | 252/306 |
| 3,336,235 | 8/1967 | Mindick et al. | 252/309 |
| 3,351,561 | 11/1967 | Albrecht et al. | 252/309 |
| 3,629,139 | 12/1971 | Vossos | 252/309 |
| 3,634,288 | 1/1972 | Youngs | 252/358 |
| 3,654,105 | 4/1972 | Chilton et al. | 252/309 |
| 3,699,049 | 10/1972 | PLuta et al. | 252/309 |
| 3,855,145 | 12/1974 | Vossos | 252/309 |

FOREIGN PATENT DOCUMENTS

| | | |
|---|---|---|
| 0 372 124 | 6/1990 | European Pat. Off. . |
| 0 607 710 | 7/1994 | European Pat. Off. . |
| 0 699 626 | 3/1996 | European Pat. Off. . |
| 908 614 | 10/1962 | United Kingdom . |
| 965123 | 7/1964 | United Kingdom . |
| 1136016 | 12/1968 | United Kingdom . |
| 1246032 | 9/1971 | United Kingdom . |

OTHER PUBLICATIONS

"The Chemistry of Silicia" pp. 412–415, John Wiley & Sons, New York, 1979 Month unknown.

Patent Abstracts of Japan, vol. 14, No. 431, Sep. 17, 1990 & JP 02 167813 (Mitsubishi Monsanto Chem Co), Jun. 28, 1990.

*Primary Examiner*—Richard D. Lovering
*Assistant Examiner*—Daniels S. Metzmaier
*Attorney, Agent, or Firm*—Connolly & Hutz

[57] ABSTRACT

The present invention relates to a process for producing low-salt silica sol dispersions in low-boiling alcohols and to the use of the organosols obtained by this process for the production of coatings on metallic and nonmetallic substrates.

14 Claims, No Drawings

PROCESS FOR PRODUCING LOW-SALT SILICA SOL DISPERSIONS IN LOW-BOILING ALCOHOLS

BACKGROUND OF THE INVENTION

The present invention relates to a process for producing low-salt silica sol dispersions in low-boiling alcohols and to the use of the organosols obtained by this process for the production of coatings on metallic and nonmetallic substrates.

Silica sol dispersions in organic solvents have long been known (see R. K Iler, The Chemistry of Silica, pages 412–415, John Wiley and Sons, New York, 1979).

Silica sols dispersed in an organic dispersing medium which has a higher boiling point than water at atmospheric pressure can be produced in a simple manner from aqueous sols. An aqueous silica sol dispersion is treated with the higher boiling organic solvent and the water is removed by distillation. Processes which employ this principle are described in detail in the literature: GB-A-965 123, EP-A 372 124, U.S. Pat. No. 2,921,913, U.S. Pat. No. 2,974,105, U.S. Pat. No. 3,004,92, U.S. Pat. No. 3,629,139, U.S. Pat. No. 3,634,288, U.S. Pat. No. 3,336,235, U.S. Pat. No. 3,699,049.

Silica sols in organic dispersing media which have a lower boiling point than water at atmospheric pressure are far more difficult to obtain. Laborious, multi-stage processes are firstly required, starting from expensive raw materials. DE-A 1 935 752, GB-A 1 136 016 and GB-A 1 246 032 describe the electrolytic preparation of an organosol such as this. A ferrosilicon anode is used as the source of silicon. The organic dispersing medium consists of a monohydric alcohol containing 1 to 3 C atoms, small proportions of water and a specified conducting electrolyte. The process is laborious and energy-intensive, and is also disadvantageous economically due to the use of expensive raw materials. Low-salt silica sols (or even low-electrolyte silica sols) thus cannot be obtained in one process step.

However, low-salt silica sols in organic low-boiling media are particularly desirable for the purpose of coating surfaces, because corrosion and blistering effects caused by a salt content do not occur.

The ideal starting materials would be the aqueous silica sol dispersions which are readily obtainable in a simple and inexpensive manner and which are available commercially in large amounts. These constitute the primary product of the industrial production of silica sols and can readily be produced in different concentrations and different sizes (diameters of about 5 to 100 nm). Other silica sots, e.g. those which have been made acidic or which have been surface-modified or subjected to ion exchange, or the salt content of which has been altered, are obtained therefrom by subsequent treatment.

The transition from the ferrosilicon anode to these aqueous silica sols as the starting material constituted a significant step forward in the technology, whereby low-salt silica sols were accessible at the same time. U.S. Pat. No. 2,801,185 and U.S. Pat. No. 3,351,561 describe the production of a silica sol in a monohydric alcohol which is miscible with water and which has a boiling point >50° C. The starting material for this process is an aqueous silica sol which is salt-free (U.S. Pat. No. 3,351,561) or which has a low cation content (U.S. Pat. No. 2,801,185). The silica sols to be used have to be produced in an upstream process step by treating the alkaline silica sots, which are the primary products, with ion exchangers. Solvent exchange is then effected by distillation. In silica sols which are obtained by this process, a large number of the OH groups on the particle surface are esterified by the alcohol used. This process for producing silica sols in organic solvents is a two-stage process when readily available, commercially customary, low-salt silica sols are used as the starting materials, and provides a product in which a large number of the OH groups on the particle surface are esterified by the alcohol used. An esterification such as this is a disadvantage for the application of the product for coating purposes, since reactive points of bonding to the surfaces to be coated are thereby removed. Co-condensation with silanes for example—which is advantageous for the application of the product for coating purposes—is also repressed due to the lack of free OH groups on the particle surface. The specific hydroxylated surface of the particles is less than 10 $m^2/g$ for products according to U.S. Pat. No. 2,801,185.

U.S. Pat. No. 3,855,145 describes the production of a low-salt silica sol, in n-propanol or in glycols for example, without esterification of the surface OH groups by the solvent taking place. In this process, an aqueous silica sol is treated first with a cation exchange resin and then with an anion exchange resin. The ion exchange resins are employed in a fixed bed process. So as to ensure that the electrolyte is removed as extensively as possible, treatment with the ion exchange resins is repeated after a period of 12 to 24 hours. After deionisation, exchange of the solvent is effected by distillation in a subsequent, further process step. The temperature during distillation is less than 100° C. The steps of deionisation and water removal are process steps which are spatially and chronologically separate from each other. In this connection, the deionisation step is associated with an additional consumption of time which is considerable. According to this patent specification, low-salt silica sols can only be obtained by an expensive, multi-stage process.

A process is described in EP-A 607 710 for the production of silica sol dispersions in alcohols containing 1 to 3 C atoms, by pervaporation of a silica sol dispersion dissolved in water and alcohol, with removal of the water down to less than 1% by weight. This process only results in a low-salt silica sol dispersion in alcohol by employing a plurality of process steps.

SUMMARY OF THE INVENTION

The object was therefore to provide a process which enables low-salt silica sols in organic solvents having a boiling point which is lower than that of water to be produced in an economically favourable and technically simple manner, and with a low energy usage. It has proved possible to achieve this object by the process according to the invention.

DETAILED DESCRIPTION OF THE INVENTION

The present invention relates to a process for producing a low-salt silica sol dispersion in $C_1$ to $C_3$ alcohols, particularly in $C_2$ and $C_3$ alcohols, most preferably in isopropanol, which contains not more than 1% by weight water and up to 56% by weight $SiO_2$ in the form of discrete particles with an average diameter of 9 to 50 nm which are not linked by interparticle siloxane bonds, characterised in that a strongly acidic cation exchange resin is added, in a one-pot process, and in an amount which is sufficient to reduce the pH to less than 4, to an alkaline aqueous silica sol which contains up to 50% by weight $SiO_2$ in the form of discrete particles with an average diameter of 9 to 50 nm which are not linked by interparticle siloxane bonds, thereafter 0.6 to 2 times the weight of the aqueous silica sol is added to $C_1$ to $C_3$ alcohols, particularly to $C_2$ and $C_3$ alcohols, most preferably to isopropanol, the water content is subsequently reduced to less than 1% by weight, the cation exchange resin is separated and the silica sol dispersion is optionally concentrated.

Reduction of the water content is preferably effected by azeotropic distillation at atmospheric or reduced pressure at constant volume, by the addition of a $C_1$ to $C_3$ alcohol.

In the case of methanol, this reduction can also preferably be effected by one-step distillation.

In another preferred embodiment, reduction of the water content can be effected by pervaporation.

In a particularly preferred embodiment, reduction of the water content is effected by ultrafiltration.

The anion and electrolyte content of the silica sol dispersion obtained can be further reduced by subsequently treating the alcoholic dispersion in an agitated bed with a strongly basic anion exchange resin until the pH no longer increases further in a sample diluted with water in a 1:1 weight ratio.

The silica sol dispersion produced by the product according to the invention is characterised by its low salt content, and is optionally low in electrolytes in addition. The low-salt silica sol dispersions produced by the process according to the invention, which are also optionally low in electrolytes, are particularly suitable for the production of coatings on metallic or nonmetallic substrates, namely for use in corresponding formulations for the production of protective coatings on the said substrates.

The starting materials used in the process according to the invention are aqueous silica sols, which are commercially obtainable (for example under the name Levasil®, which are products of Bayer AG) in their alkaline form with a pH≧9.

Alcohols, particularly $C_2$ and $C_3$ alcohols, and especially isopropanol, are used as the organic solvent in the degree of purity which is necessary for the application of the final product. It is known that water forms a binary azeotrope with $C_2$ and $C_3$ alcohols in each case. For i-propanol, for example, the boiling point of the azeotrope at atmospheric pressure is 80.4° C. and the water content of the azeotrope is 12.2% by weight. Various methods, including pervaporation or steam permeation amongst others, can be used for the separation of the azeotrope and the recovery of isopropanol, and also of other alcohols. If pervaporation is used to remove the water from an aqueous-isopropanolic solution, a separation step is unnecessary.

Commercially available, strongly acidic cation exchangers, such as cation exchange resins with a polystyrene skeleton, which mostly contain sulphonic acid groups but also contain phosphonic acid groups, are used in the process according to the invention, as are acidic zeolites, such as zeolite Y or ZSM-5 in the H$^+$ form. Strongly basic anion exchange resins are used for the subsequent removal of anions which is optionally effected.

The temperatures in the process according to the invention can be varied over a wide range. In general, they are preferably between 20° and about 100° C., most preferably between 30° and 50° C.

The process can be conducted at normal pressure, or may also be conducted under reduced pressure. In general, pressures between 50 and about 1000 mbar are employed, preferably between 100 and 200 mbar. Separation processes for reducing the water content which are operated under pressure, such as ultrafiltration for example, operate under higher pressures of 0.2 to 10 bar, for example, or under corresponding pressures which are particularly suitable for the process. When water is removed by azeotropic distillation, the operating temperature and operating pressure are related to each other by the temperature-dependent vapour pressure equilibrium of the solvent mixture (e.g. i-propanol/water).

Accurate monitoring of pH is particularly important in the process according to the invention. The pH must not increase above a limit of about 4. It is known that silica sol dispersions tend to gel very rapidly within a pH range of 4 to 6. Solvent exchange therefore has to be effected in a pH range <4, preferably between 2 and 3. Accordingly, particular attention must be paid in the process according to the invention to the addition of sufficient amounts of cation exchange resin, and to the continuous monitoring of the pH. The addition of a sufficient amount of cation exchange resin ensures that the pH does not rise into the said critical range. A sufficient amount of cation exchange resin is therefore one which reduces the pH in the aqueous-alcoholic silica sol dispersion to pH values between 2 and 3.

When carrying out the process according to the invention, the alkaline, aqueous silica sol is preferably treated with a $C_1$ to $C_3$ alcohol in a weight ratio of 1:0.6 to 1:2 and with a sufficient amount of the strongly acidic cation exchange resin, whereby almost all the cations contained in the dispersion are removed and a low-salt product is obtained. The cation content can be determined by customary analytical methods. In a preferred variant, following the addition of $C_1$ to $C_3$ alcohol and cation exchange resin to the silica sol, a distillation at constant volume is effected, which is preferably an azeotropic distillation for the $C_2$ and $C_3$ alcohols, by the addition of alcohol for the removal of the water. In this respect, the amount of solvent mixture distilled off per unit time is substantially dependent on the available evaporator capacity, namely on the amount of energy which can be supplied. During the process of solvent exchange and the concentration step which optionally follows it, good mixing throughout of the reactor contents must be ensured. The effect of this is to ensure contact of the dispersion with the ion exchange resin, which is advantageous for ion exchange.

In order to monitor the process and to check to what extent solvent exchange has proceeded, the water content of a sample of the mixture can be determined, by the Karl Fischer method for example. Other methods, such as monitoring the boiling point, can also be employed. The presence of the ion exchange resin during the entire process of solvent exchange is very advantageous. This ensures the almost complete removal of cations. The subsequent diffusion of further salts from the particles is also favoured by an elevated temperature, and this fraction of metal cations can be captured by the cation exchange resin which is present during the entire process.

Before initiating the concentration process which is optionally effected, the product is preferably filtered from the cation exchange resin. Thereafter, the product may preferably be concentrated to an increased solids concentration of between 30 and 56% by weight, for example.

The azeotropic solvent mixture of alcohol and water which is formed during distillation can be subjected to a customary separation step in order to recycle the alcohol used.

In another process variant in which the water is removed from the aqueous-alcoholic solution by means of pervaporation in the presence of the cation exchange resin, in the case of $C_2$ and $C_3$ alcohols the removal of water from the aqueous-alcohol dispersion proceeds without the formation of an alcohol-water azeotrope, so that azeotrope separation is dispensed with.

Moreover, in a further process step it is possible deliberately to increase the pH of the anhydrous or almost anhydrous alcohol dispersion, by anion exchange, to within the neutral range. In the course of this procedure, the viscosity increases with decreasing anion content. Even if a gel-like consistency is thereby obtained, the product can be applied as a coating without difficulty.

Determination of the particle size distribution by means of an analytical ultracentrifuge has shown that the particles in dispersions produced by the process according to the invention are not formed into aggregates. It has been verified by spectroscopic methods that esterification of the particle surfaces has not occurred.

The products obtained by the process according to the invention exhibit excellent adhesion to clean metallic and nonmetallic substrates. The present invention therefore also comprises the use of the silica sol dispersions produced by the process according to the invention, optionally in appropriate formulations, for coating purposes and for the production of protective coatings on metallic and nonmetallic substrates.

The invention will be explained in more detail with reference to the following examples.

EXAMPLES

Example 1

1148 g (953 ml) Levasil® 300/30% (a commercial product supplied by Bayer AG; 30% solids content, specific surface 300 m²/g, pH 10.0) were mixed with stirring with 40 g of activated, strongly acidic Lewatit SPC 108 cation exchange resin in the $H^+$ form (commercial product supplied by Bayer AG), and were subsequently mixed, with stirring and at room temperature, with 1000 ml isopropanol.

The water contained in the mixture was almost completely removed by azeotropic distillation at constant volume and at atmospheric pressure. 1 liter of isopropanol per hour was steadily added, and 1 liter of isopropanol/water per hour was distilled off as an azeotropic mixture. In total, 8 l isopropanol were subsequently added in this manner. The ion exchange resin was separated by coarse filtration, and the filtrate was reduced to 1127 g, corresponding to 28% by weight $SiO_2$, at a temperature of 35° to 45° C. and at a pressure of 100 to 200 mbar.

Example 2

1150 g (955 ml) Levasil® 300/30% were mixed with 3000 ml isopropanol, and were thereafter mixed, with stirring, with 40 g of activated, strongly acidic Lewatit SPC 108 cation exchange resin in the $H^+$ form.

The mixture was then heated to the boiling temperature (about 80° C.; slowly increasing to 82.4° C.), and the volume distilled off in the distillation column (i-propanol/water mixture) was continuously replaced by anhydrous isopropanol. After 7 hours, 10 l of isopropanol/water mixture had distilled off. The ion exchange resin was separated by filtration. The silica sol in isopropanol was concentrated to 30% by weight $SiO_2$ by evaporative boiling at normal pressure.

Example 3

The products obtained in Examples 1 and 2 were mixed. The conductivity of the mixture was 95 µS, and the pH of a sample mixed with water in a 1:1 ratio was measured as 2.6. The product had a density of 1.03 g/ml and a viscosity, as measured in a Höppler falling sphere viscometer, of 12 mPas at 20° C. The $SiO_2$ content of the silica sol dispersion was 30% by weight, its water content as determined by Karl Fischer titration was 1% by weight, and its turbidity was 220 TE/F. Measurement of the particle size distribution in an analytical ultracentrifuge showed that it contained particles in the range of 6 to 24 nm.

Example 4

2000 ml Levasil® 300/30% (30% solids content, specific surface 300 m²/g, pH 9.9) were mixed, with stirring, with 90 g of activated Lewatit SPC 108 in the $H^+$ form, and were subsequently mixed, with stirring and at room temperature, with 1500 ml isopropanol.

The water contained in the mixture was almost completely removed by azeotropic distillation at constant volume under reduced pressure (35° to 40° C., 100 to 200 mbar). 1 liter of isopropanol per hour was steadily added, and 1 liter of isopropanol/water per hour was distilled off as an azeotropic mixture. In total, 16 l isopropanol were subsequently added in this manner. The ion exchange resin was separated by coarse filtration, and the filtrate was reduced to 2234 g, corresponding to a $SiO_2$ concentration of 32% by weight, at a temperature of 35° to 45° C. and at a pressure of 100 to 200 mbar.

Example 5

1000 ml Levasil® 300/30% were mixed, with stirring, with 40 g of activated Lewatit SPC 108 in the $H^+$ form, and were subsequently mixed, with stirring and at room temperature, with 2000 ml isopropanol.

The mixture was allowed to stand overnight.

The water contained in the mixture was almost completely removed by azeotropic distillation at constant volume under reduced pressure (35° to 45° C., 100 to 200 mbar). 1 liter of isopropanol per hour was steadily added, and 1 liter of isopropanol/water per hour was distilled off as an azeotropic mixture. In total, 8 l isopropanol were subsequently added in this manner. After the addition of this amount of isopropanol, the product was reduced to 1195 g, corresponding a concentration of 31% by weight $SiO_2$, at a temperature of 30° to 45° C. and at a pressure of 100 to 200 mbar. The product was separated from the ion exchange resin by coarse filtration and was washed with a little isopropanol.

The silica sols from Examples 4 and 5 were mixed. A water content of 0.87% by weight was determined in the mixture by Karl Fischer titration. The conductivity of the product was 95 µS, the $SiO_2$ content was 28% by weight, and the viscosity, as measured in a Haake rotating viscometer Type VT 500 at 20° C., was 741 mPas. The sol exhibited a milk-like turbidity. The particle size distribution measured in an analytical ultracentrifuge showed that it contained particles in the range of 5 to 160 nm.

Example 6

250 g Levasil® 300/30% were mixed with 500 g ethanol, and were treated, with stirring, with 10 g of activated, strongly acidic Lewatit SPC 108 cation exchange resin in the $H^+$ form. A total of 3925 g ethanol were added to the mixture at constant volume at 50° to 55° C., and at a pressure of 250 to 300 mbar, whilst an identical volume of ethanol-water mixture was distilled off. Thereafter, the ion exchange resin was filtered off.

Concentration of the product by distilling off ethanol gave a clear sol containing 0.04% by weight $H_2O$ and 56% by weight $SiO_2$ in ethanol.

Example 7

500 g Levasil® 300/30% were mixed with 1000 g methanol; 20 g of Lewatit SPC 108 cation exchange resin in the F form were added to the mixture. A methanol-water mixture was distilled off from the stirred mixture at normal pressure. A total of 13,500 g methanol were added over 10 hours in order to keep the volume constant. Thereafter, the ion exchange resin was filtered off and the filtrate was reduced by boiling to a residue of about 280 g.

Analysis gave an $SiO_2$ content of 51.9% by weight and a water content of 1.5% by weight.

We claim:

1. A process for producing a low-salt silica sol dispersion in $C_1$ to $C_3$ alcohols, which contains less than 1% by weight water and up to 56% by weight $SiO_2$ in the form of discrete particles with an average diameter of 9 to 50 nm which are not linked by interparticle siloxane bonds, comprising adding a strongly acidic cation exchange resin, in a one-pot process, and in an amount which is sufficient to reduce the pH to less than 4, to an alkaline aqueous silica sol which contains up to 50% by weight $SiO_2$ in the form of discrete particles with an average diameter of 9 to 50 nm which are not linked by interparticle siloxane bonds, thereafter adding 0.6 to 2 times the weight of the aqueous silica sol based on the alcohol to a $C_1$ to $C_3$ alcohol, subsequently reducing the water content to less than 1% by weight, separating the cation exchange resin and optionally concentrating the silica sol dispersion to obtain up to 56% by weight $SiO_2$.

2. A process according to claim 1, wherein isopropanol is used as the alcohol.

3. A process according to claim 1, wherein reduction of the water content to less than 1% by weight is effected by azeotropic distillation at atmospheric or reduced pressure, and at constant volume by the addition of the corresponding $C_1$ to $C_3$ alcohol.

4. A process according to claim 1, wherein the reduction of the water content to less than 1% by weight is effected by pervaporation.

5. A process according to claim 1, wherein the reduction of the water content to less than 1% by weight is effected by ultrafiltration.

6. A process according to claim 1, wherein the silica sol dispersion is treated with a strongly basic anion exchange resin until the pH no longer increases further.

7. A process according to claim 1, wherein the process is conducted at a temperature ranging from about 20° C. to about 100° C.

8. A process according to claim 1, wherein the process is conducted at a pressure ranging from about 50 mbar to about 10 bar.

9. A process according to claim 1, wherein the strongly acidic cation exchange resin is selected from the group consisting of: cation exchange resin with a polystyrene skeleton that contain sulphonic acid groups and phosphonic acid groups.

10. A process according to claim 1, wherein the amount of strongly acidic cation exchange resin added is sufficient to reduce the pH to the range between 2 and 3.

11. A process according to claim 2, wherein the silica sol dispersion is treated with a strongly basic anion exchange resin until the pH no longer increases further.

12. A process according to claim 3, wherein the silica sol dispersion is treated with a strongly basic anion exchange resin until the pH no longer increases further.

13. A process according to claim 4, wherein the silica sol dispersion is treated with a strongly basic anion exchange resin until the pH no longer increases further.

14. A process according to claim 5, wherein the silica sol dispersion is treated with a strongly basic anion exchange resin until the pH no longer increases further.

* * * * *

UNITED STATES PATENT AND TRADEMARK OFFICE
CERTIFICATE OF CORRECTION

PATENT NO. : 5,885,485
DATED : Mar. 23, 1999
INVENTOR(S) : Uwe Brekau, et al

It is certified that error appears in the above-identified patent and that said Letters Patent is hereby corrected as shown below:

Column 1, lines 50 and 66, "sots" should read -- sols --.

Signed and Sealed this

Tenth Day of August, 1999

Attest:

Q. TODD DICKINSON

Attesting Officer

Acting Commissioner of Patents and Trademarks